March 10, 1931. T. W. W. FORREST 1,795,302
CONDITIONING APPARATUS
Filed May 7, 1930 2 Sheets-Sheet 1
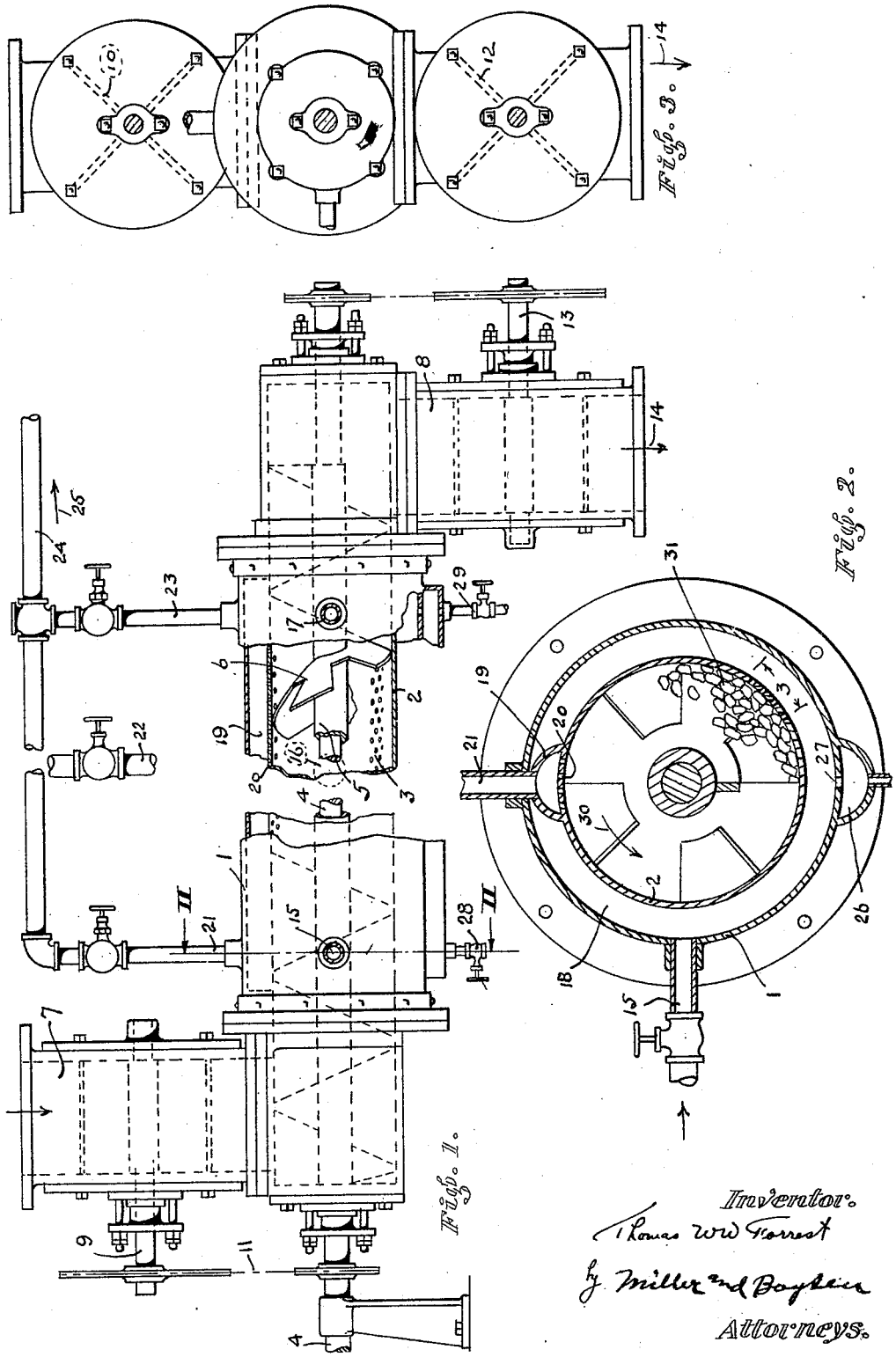

March 10, 1931.  T. W. W. FORREST  1,795,302
CONDITIONING APPARATUS
Filed May 7, 1930    2 Sheets-Sheet 2
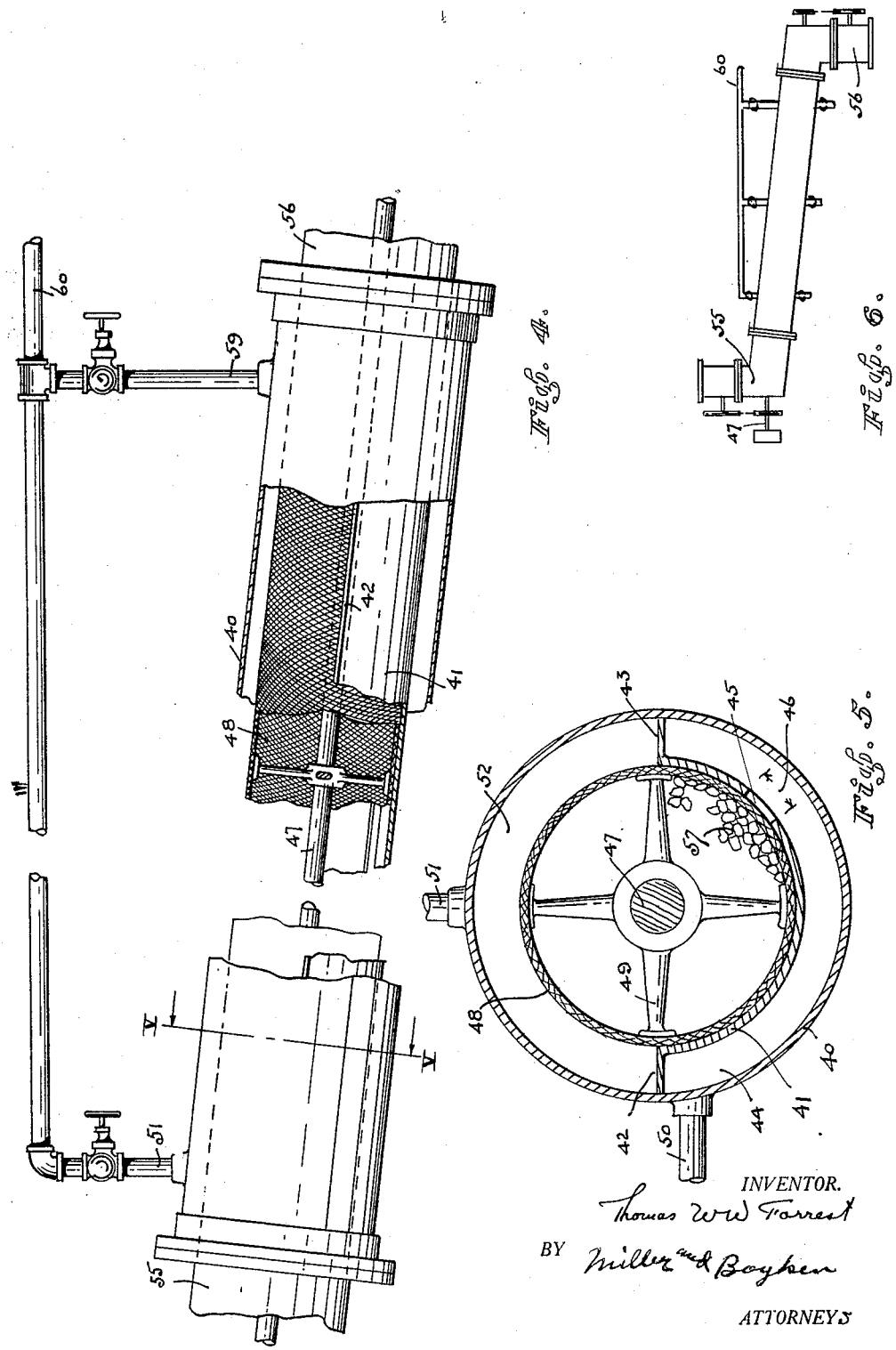

Patented Mar. 10, 1931

1,795,302

UNITED STATES PATENT OFFICE

THOMAS W. W. FORREST, OF FRESNO, CALIFORNIA, ASSIGNOR TO SUN-MAID RAISIN GROWERS OF CALIFORNIA, OF FRESNO, CALIFORNIA, A COOPERATIVE ASSOCIATION OF CALIFORNIA

CONDITIONING APPARATUS

Refiled for abandoned application Serial No. 751,567, filed November 22, 1924. This application filed May 7, 1930. Serial No. 450,580.

This case is filed in place of case filed under Serial No. 751,567, filed Nov. 22, 1924, held abandoned by the Patent Office through non-receipt of amendment lost in the mails.

My invention has for its object the treatment and conditioning of food products to prepare them for handling, packing and marketing, whereby the excess moisture is removed therefrom and the product units are brought into the proper condition by the removal of heat and superfluous moisture.

My apparatus is particularly advantageous in the treatment of raisins and in that part of the process of preparing the raisins for the market after they have left the seeder although it may also be used for the removal of heat, moisture and the surface conditioning or unseeded raisins, seedless raisins or other products.

Other objects will appear from the drawings and specifications which follow.

These objects I accomplish by passing the product to be conditioned through a tubular member wherein the product units undergo a constant rearrangement and exposure of their surfaces in a zone of relatively dry air which air takes up the heat and surface moisture and conditions the product units for subsequent handling or packing. The utilized air is removed as fast as it takes up the moisture and heat.

By referring to the accompanying drawings my invention will be made clear.

Referring to the drawings, Fig. 1 is a horizontal view of apparatus especially adapted to the conditioning of raisins and containing my invention, with certain of the parts broken away to better illustrate the interior construction.

Fig. 2 is a cross section of Fig. 1 on the line II—II thereof.

Fig. 3 is an end view of Fig. 1.

Fig. 4 is an alternate arrangement of a portion of a different apparatus containing my invention.

Fig. 5 is a cross section of Fig. 4 on the line V—V thereof.

Fig. 6 is a diagram of the assembly of the apparatus fragmentarily shown in Figs. 4 and 5.

Throughout the figures similar numerals refer to identical parts.

The numeral 1 indicates a cylindrical chamber in which is mounted the cylindrical compartment 2 perforated with a large number of perforations arranged longitudinally at 3. At 4 is a rotating main driving shaft adapted to be driven by any conventional power means and on this shaft is mounted the hub 5 carrying the conveyor 6 by which the raisins are advanced from the inlet 7 to the outlet 8. I prefer to use a toothed spiral conveyor as shown but other forms may be used if preferred.

A valve of the paddle wheel type is shown at 10 mounted on the shaft 9 driven by the chain and sprockets 11 to control the rate of flow of the raisins from the inlet 7 into the cylindrical compartment 2 consistent with the rate of travel of the raisins and the capacity of the apparatus.

At 12 is a paddle wheel discharge valve mounted on the shaft 13 for the discharge of the raisins in the direction of the arrow 14 after they have been conditioned.

At 15, 16, 17, are a plurality of inlets to the chamber 1 adapted to supply dry compressed air to the space 18 between chamber 1 and compartment 2. At 19 is a discharge chest longitudinally mounted on the wall of the compartment 2 and communicating with the interior of compartment 2 by a plurality of ports 20.

The discharge chest is exhausted by the plurality of exhaust pipes shown at 21, 22, 23, communicating through the main exhaust pipe 24 with conventional exhaust apparatus which removes the moisture-laden air in the direction of the arrow 25.

The lower wall of the chamber 1 is provided with the drain 26, drain ports 27 and outlet valves 28, 29, suitably located therein to discharge any moisture which may collect in the space 18.

In the setting and operation of my apparatus when conditioning seeded raisins I prefer to cause the raisins to roll against the compartment wall during their treatment. This results in compacting the raisins into individual units and largely closes the openings caused by the removal of seeds making a better appearing and more freely flowing product. This may be accomplished by varying the inclination of apparatus and therefore the raisin path, the pitch of the conveyor, the diameter of the chamber or the speed of the apparatus, or a combination of said factors.

The operation is as follows: Raisins to be conditioned are fed into the inlet hopper 7 and their rate of flow into the compartment 2 is controlled by the paddle valve 10 from which they fall into the inlet end of the compartment 2 and are there picked up by the spiral conveyor 6 which turns them about among themselves during their successive increments of travel constantly exposing their surfaces to the action of the flowing air.

Because of the action of the spiral-toothed conveyor in the direction of the arrow 30 (see Fig. 2) the raisins will be distributed along the lower portion of one of the walls of the compartment 2 as shown at 31 and will travel from one end of the compartment to the other in substantially this position to the right of a vertical plane through the shaft 4, and during their travel will be constantly exposed to the action of flowing dry and cold air from the connections 15, 16, 17, and filling the space 18 from which the air will pass through a large number of ports 3 into the mass of agitated raisins collecting therefrom their surface moisture and heat and will then pass through the ports 20 and chest 19 and out through the exhaust pipes 21, 22, 23, into the common pipe 24 and in the direction of the arrow 25 to the exhaust apparatus.

The superfluous moisture and heat will therefore be abstracted from the raisins 31 during their transit from the inlet 7 to the outlet 8 and upon arriving at the end of the conveyor 6 they fall through the outlet and paddle discharge valve 12 in the direction of the arrow 14, fully conditioned and ready for handling or packing.

Referring particularly to Figs. 4, 5 and 6 wherein is shown another form of apparatus employing my invention; a tubular chamber is indicated by the numeral 40 within which is mounted a concentric substantially semi-cylindrical member of smaller radius indicated at 41, forming with the sides 42, 43, a closed inlet space 44 and having a longitudinal cut-away portion 45 having substantially the width indicated by the dimension line 46. At 47 is a rotating shaft and at 48 a cylindrical member perforated or of screen material mounted to rotate with the shaft 45 and supported on the spider 49.

At 50 is a compressed air inlet supply to the space 44 and at 51 is a connection to the space 52 between the upper portion of the chamber 40 and screen member 48.

The apparatus is mounted with a downward inclination as indicated in Fig. 4 so that as the screen 48 rotates in the direction of the arrow 30 the rasins will be fed from the inlet end 55 towards the outlet end 56 and will occupy that portion of the cylindrical member 48 to the right of the longitudinal central vertical plane as indicated in section at 57 substantially over the cut-away portion 45 in the member 41.

The operation will be that, as the rasins travel from 55 to 56, dry air will flow from the space 44 through the screen member 48 opposite the cut-away portion 45 of the member 41 and through the raisins 57 abstracting the heat and superfluous moisture and thence outward through the upper half of the cylindrical screen 48 into the space 52 and thence outward through the pipes 51, 59, and connecting pipe 60 to conventional exhaust apparatus.

Where a particularly high grade product is desired, glycerine or other reagent may be introduced with the air and the product units will thereupon take a modicum of the reagent improving their surface appearance and consistency.

I claim:

1. Fruit conditioning apparatus comprising a substantially horizontally arranged cylindrical chamber with a cylindrical compartment therein, a spiral conveyor arranged within the compartment to transfer product therethrough, perforations positioned in the lower portion of the compartment wall to one side of the vertical center line and drain means from the chamber.

2. Fruit conditioning apparatus comprising a substantially horizontally arranged cylindrical chamber, a spiral conveyor adapted for transferring dried fruit through said chamber, an inlet valve controlling the delivery of fruit to the chamber and substantially sealing the entrance from outer atmosphere, and similar sealing means forming a discharge from said chamber, an outer casing spacedly surrounding said chamber and said chamber being perforated to one side only of its vertical center line below its horizontal center line.

3. Fruit conditioning apparatus comprising an outer cylindrical casing substantially horizontally arranged, an inner cylindrical casing spaced within said outer casing, a venting channel on top of the inner casing vented through the outer casing, drainage means at the bottom of the outer casing, a spiral conveyor within the inner casing and said casing having a zone of perforations therein adjacent the bottom to one side of its vertical center line only communicating with the inter casing space.

4. Fruit conditioning apparatus comprising an outer cylindrical casing substantially horizontally arranged, an inner cylindrical casing spaced within said outer casing, an inverted trough on top of the inner casing forming a longitudinal channel flue sealed thereagainst, a pipe passing through the outer casing and entering said channel, a valved pipe communicating with the interior of the outer casing, a trough secured longitudinally to the under-side of the outer casing and the casing being perforated for draining into the trough, a spiral conveyor mounted for revolution within the inner casing and the inner casing being perforated to vent into the upper trough and perforated along one lower side to vent into the inter casing space.

THOMAS W. W. FORREST.